(12) United States Patent
Kim

(10) Patent No.: US 7,520,545 B2
(45) Date of Patent: Apr. 21, 2009

(54) ROBOT FOR TRANSFER OF GLASS

(75) Inventor: Deuk Soo Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 265 days.

(21) Appl. No.: 11/167,142

(22) Filed: Jun. 28, 2005

(65) Prior Publication Data

US 2006/0104794 A1 May 18, 2006

(30) Foreign Application Priority Data

Jun. 29, 2004 (KR) .................... 10-2004-0049514

(51) Int. Cl.
*B65G 49/05* (2006.01)
*B25J 15/10* (2006.01)
(52) U.S. Cl. .................... 294/1.1; 294/902; 414/941
(58) Field of Classification Search ............... 294/1.1, 294/2, 64.1, 902; 414/936, 941, 758
See application file for complete search history.

(56) References Cited

U.S. PATENT DOCUMENTS

| | | | | |
|---|---|---|---|---|
| 4,595,333 A * | 6/1986 | Ono et al. | .................... | 414/729 |
| 4,770,455 A * | 9/1988 | Collins, Jr. | .................... | 294/88 |
| 5,161,846 A * | 11/1992 | Yakou | ........................ | 294/106 |
| 5,937,993 A * | 8/1999 | Sheets et al. | ............. | 198/345.1 |
| 5,967,159 A * | 10/1999 | Tateyama | .................... | 134/61 |
| 6,062,241 A * | 5/2000 | Tateyama et al. | ........... | 134/137 |
| 6,152,677 A * | 11/2000 | Tateyama et al. | ........... | 414/738 |
| 6,167,322 A * | 12/2000 | Holbrooks | ................... | 700/112 |
| 6,540,468 B1 * | 4/2003 | Blattner et al. | ......... | 414/416.08 |
| 7,055,875 B2 * | 6/2006 | Bonora et al. | .............. | 294/64.1 |

* cited by examiner

*Primary Examiner*—Dean J Kramer
(74) *Attorney, Agent, or Firm*—McKenna Long & Aldridge LLP

(57) ABSTRACT

Disclosed is a robot for transferring a substrate, wherein the robot has a robot arm, a hand part, which includes a plurality of plates. A plurality of pins protrude from the plates such that each pin may be folded downward. The pins include a rubber or resin with thermally insulating properties. By selectively folding down a certain number of the pins, contact may be minimized between the substrate and the robot, thereby preventing damage to the substrate such as thermally-induced defects and stains.

6 Claims, 5 Drawing Sheets

ROBOT FOR TRANSFER OF GLASS

This application claims the benefit of the Korean Application No. P2004-49514 filed on Jun. 29, 2004, which is hereby incorporated by reference as if fully set forth herein.

BACKGROUND OF THE INVENTION

1. Field of the Invention

The present invention relates to a robot for transfer of glass, and more particularly, to a robot for transfer of glass that prevents stains and defects caused by a robot hand.

2. Discussion of the Related Art

Liquid Crystal Display (LCD) devices have become widely used due to advantageous characteristics such as compact size, thin profile, and low power consumption. As such, LCDs have become substitutes for Cathode Ray Tube (CRT) displays.

In general, the LCD device includes an LCD panel, wherein the LCD panel includes a thin film transistor substrate, a color filter substrate, and a liquid crystal layer. The thin film transistor includes a gate line, a data line, a thin film transistor, and a pixel electrode. The gate line crosses the data line at the right angle, thereby defining a pixel region. The thin film transistor and the pixel electrode are formed in the pixel region. The color filter substrate generally includes a color filter layer and a common electrode. The liquid crystal layer is formed between the thin film transistor substrate and the color filter substrate.

A method for fabricating the LCD device generally includes three processes: a substrate fabrication process, a cell process, and a module process.

The substrate fabrication process includes two steps of forming a thin film transistor array and forming a color filter array. In the step of forming the thin film transistor array, a plurality of thin film transistors and pixel electrodes are formed on a lower substrate. In the step of forming the color filter array, a color filter layer of R, G and B is formed on an upper substrate having a black matrix layer by using pigment or dye, and a common electrode of ITO is formed on the upper substrate.

During the cell process, spacers are formed between the lower substrate having the thin film transistor array and the upper substrate having the color filter array, to maintain a cell gap between them. Then, the two substrates are bonded to each other, and liquid crystal is injected between the two substrates, thereby forming an LCD panel having a plurality of cells.

In the module process, the LCD panel is connected with a signal processing circuit to form an LCD device.

To fabricate the LCD device through the substrate fabrication process, the cell process and the module process, it is necessary to load the substrate into various equipment, or to unload the substrate from the equipment in order.

Also, since it is impossible to stop the fabrication process line due to some defects of the equipment, a plurality of substrates are moved together using a cassette for temporarily storing the substrates. Accordingly, the plurality of substrates are loaded into the cassette by a transfer robot and unloaded from the cassette by the transfer robot according to the predetermined order.

FIG. 1 is a perspective view of a transfer robot according to the related art.

As illustrated in FIG. 1, the transfer robot 50 according to the related art includes a main axis 51, a robot arm 52, and a hand part 53. The robot arm 52 is mounted on the main axis 51 allowing it to rotate, wherein the robot arm 52 may also move in parallel, fold, or extend. The hand part 53 is provided in the fore end of the robot arm 52, wherein the substrate 15 is loaded on the hand part 53.

In the transfer robot 50 having the aforementioned structure, the substrate 15 is unloaded from the cassette (not shown) by the robot arm 52. Then, the substrate 15 is loaded on the hand part 53, and the substrate 15 is loaded on a stage 25 by rotation of the hand part 53. The stage 25 is positioned on an opposite side to the cassette (not shown). A plurality of lift pins 26 are provided in the stage 25, wherein the lift pins 26 move up and down. If the substrate is positioned on the stage 25 by the rotation of the robot arm 52, the lift pins 26 are moved upward, whereby the substrate 15 is separated from the robot arm 52. After separating the substrate 15 from the robot arm 52, the lift pins 26 are moved downward so that the substrate 15 is loaded onto the stage 25.

When the substrate 15 is stored in the cassette, the substrate 15 may be oriented at a slant or may be straight. Accordingly, the robot 50 senses and compensates for the position and orientation of substrate 15 (X-axis, θ-axis, the traveling axis) when loading the substrate 15, whereby the substrate 15 is loaded on the stage 25 at the correct position.

Referring to FIG. 1, the X-axis is defined along the direction of motion for forwarding the substrate toward the stage 25. The θ-axis is defined by the rotation to make substrate 15 and the stage 25 in parallel when the plane surface of the substrate 15 is otherwise diagonal to the plane surface of the stage 25. The traveling axis is defined as the direction of translation along the θ-axis, and may be orthogonal to the X-axis. Motion along the traveling axis is for aligning the substrate 15 with the stage 25 when the substrate 15 is positioned at the side of the stage 25.

To sense the position of the substrate 15, the hand part 53 of the transfer robot 50 has first and second sensors 54 and 55. The first and second sensors 54 and 55 sense the position state of the substrate 15. For example, the first and second sensors 54 and 55 detect the position of the substrate 15 relative to the X-axis and θ-axis. Accordingly, the transfer robot 50 senses the correct position of the substrate 15, and aligns the substrate 15 according to a compensation value, and then loads the substrate 15 on the stage 25.

FIG. 2 illustrates a hand part 53 of a related art robot for transferring a substrate. As illustrated in FIG. 2, the hand part 53 is provided with a connector 34, a plurality of plates 38, and a plurality of pads 39. One side of the connector 34 is connected with the robot arm 52 of FIG. 1. The plurality of plates 38 are arranged along one direction at fixed intervals at the other side of the connector 34. The plurality of pads 39 protrude from the upper surface of each of the plates 38. The plurality of pads 39 are formed of rubber to fix the substrate 15 by a vacuum force.

The related art robot for transferring a substrate has the hand part 53, wherein the hand part 53 is provided at the fore end of the robot arm 52 so that it can be rotated, translated, and extended. Also, the hand part 53 has the plurality of pads 39, wherein each of the plurality of pads 39 includes a ring-shaped sidewall for fixing the loaded substrate.

FIG. 3 illustrates the pad 39 of FIG. 2. As illustrated in FIG. 3, each of the pads 39 is formed of a main body having a circle-shaped bottom. The pad 39 includes a sidewall 41 and a bottom 42. A hole 43 of the predetermined diameter is formed in the center of the bottom 42. Although not shown, the vacuum device is additionally provided to supply the vacuum force to the pad 39.

When the substrate 15 is loaded on the hand part 53, the vacuum force is provided to the pad 39, whereby the substrate 15 is fixed to the pad 39. Then, the substrate 15 is transferred to the next process.

However, the robot for transferring substrates according to the related art has the following disadvantages.

When the substrate is in contact with the pads 39 after a baking process of 200° C. or more, an amount of heat from the substrate is conducted to the pad 39, causing a localized temperature drop on the substrate. Accordingly, the contact efficiency is lowered on the portions of the substrate having the temperature drop. After etching the substrate after a development process, the portions of the substrate subject to the temperature drop may have the various defects such as an adhesion failure in the respective layers of array, rolling, and thermal images.

Especially, as the substrate has the thin profile, an amount of heat is easily transmitted from the surface of the substrate to the pad 39. Thus, the yield may be lowered due to the defects such as a thermal image.

Accordingly, as the substrate is fixed to the pad by the vacuum force, ring-shaped prints are formed on the substrate due to the sidewall of the pad. The ring-shaped prints of the substrate may cause a thermal image along with the mechanical deformation due to thermal expansion and contraction.

In addition, stains may be generated on the substrate due to the use of pads. Especially, when loading the substrate spin-coated with a conductive material, stains can be generated on the substrate, thereby lowering the yield.

SUMMARY OF THE INVENTION

Accordingly, the present invention is directed to a robot for transfer of glass that substantially obviates one or more of the aforementioned problems due to limitations and disadvantages of the related art. In general, the present invention achieves this by providing a plurality of thermally insulating pins, which may be individually folded down to minimize contact with the glass.

An advantage of the present invention is that it improves the yield of an LCD fabrication process.

Another advantage of the present invention is that it reduces thermally-induces defects in LCD substrates.

Another advantage of the present invention is that it reduces the risk of staining a substrate during LCD fabrication.

Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with a robot for transferring a substrate, wherein the robot comprises a robot arm; and a hand part mounted at a fore end of the robot arm, wherein the hand part includes a connector having a side connected to the robot arm, a plate; and a plurality of pins disposed on an upper surface of the plate, and wherein each of the pins protrudes upward and may individually be folded downward.

In another aspect of the present invention, the aforementioned and other advantages are achieved by a method of manufacturing an LCD module, which comprises forming a plurality of thin film transistors and pixel electrodes on a first substrate; providing a second substrate; bonding the first substrate to the second substrate; and injecting a liquid crystal between the first and second substrates, wherein forming a plurality of thin film transistors and pixel electrodes includes unloading the first substrate from a cassette using a robot having a plurality of pins, wherein unloading the first substrate includes: selecting a subset of pins from the plurality of pins for contacting the substrate, wherein selecting is based on the temperature sensitivity of the substrate; folding down a remaining subset of pins from the plurality of pins; and placing the first substrate in contact with the subset of pins.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a robot for transferring glass according to the present invention will be described with reference to the accompanying drawings.

Figure 1:
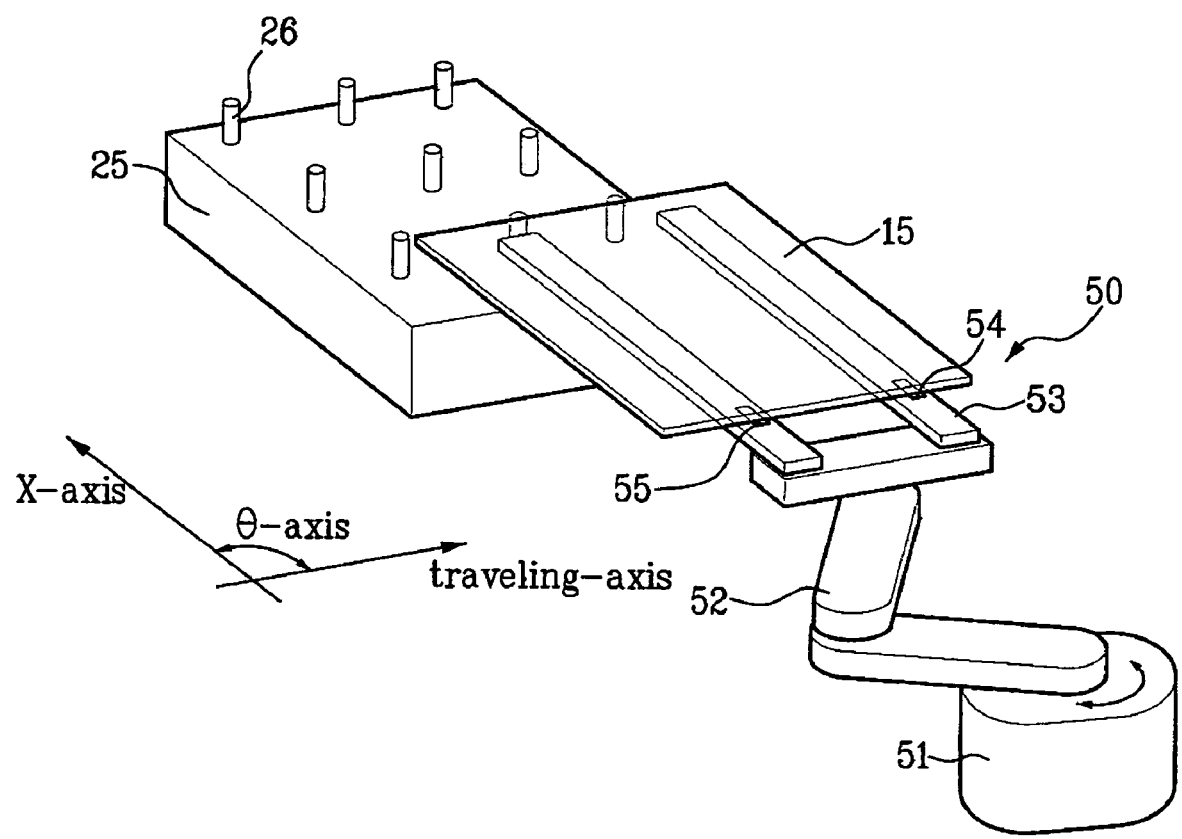
FIG. 1 is a perspective view of a related art robot for transferring glass.
Figure 2:
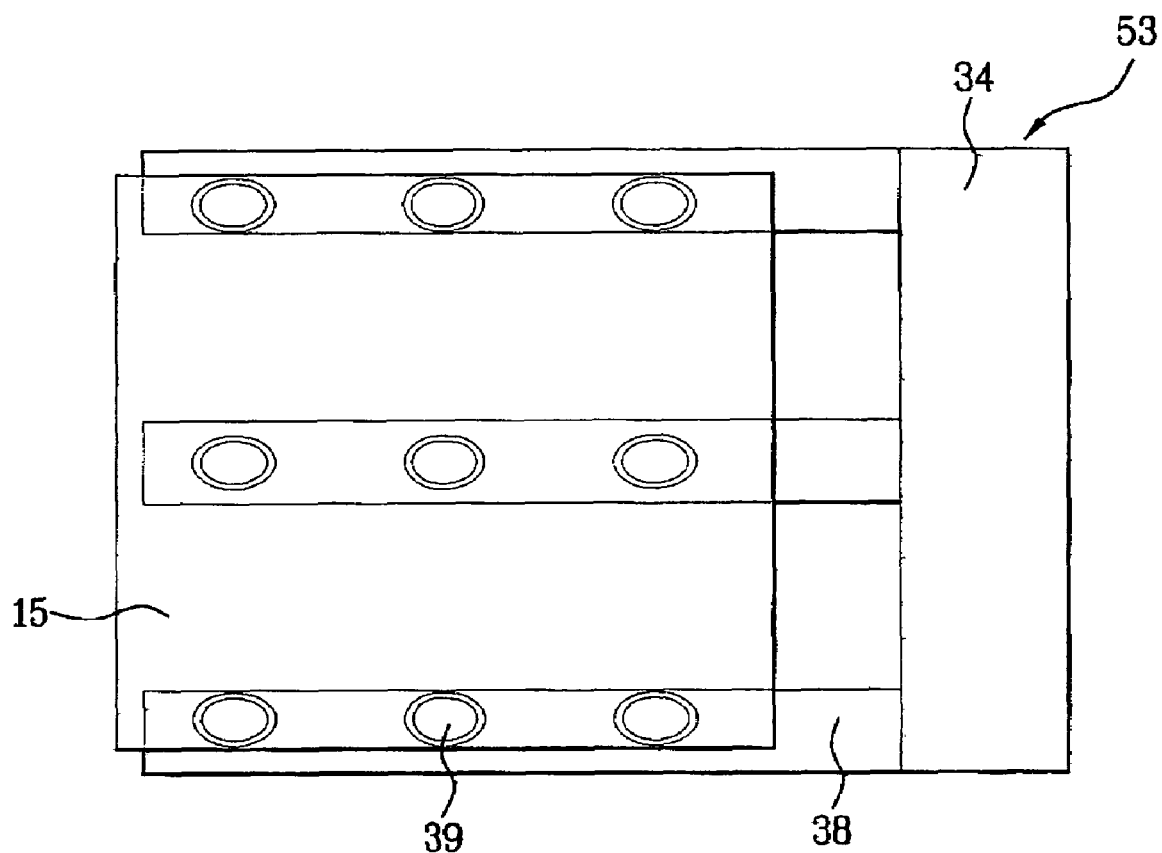
FIG. 2 is a detailed view of a hand part of a related art robot for transferring glass.
Figure 3:
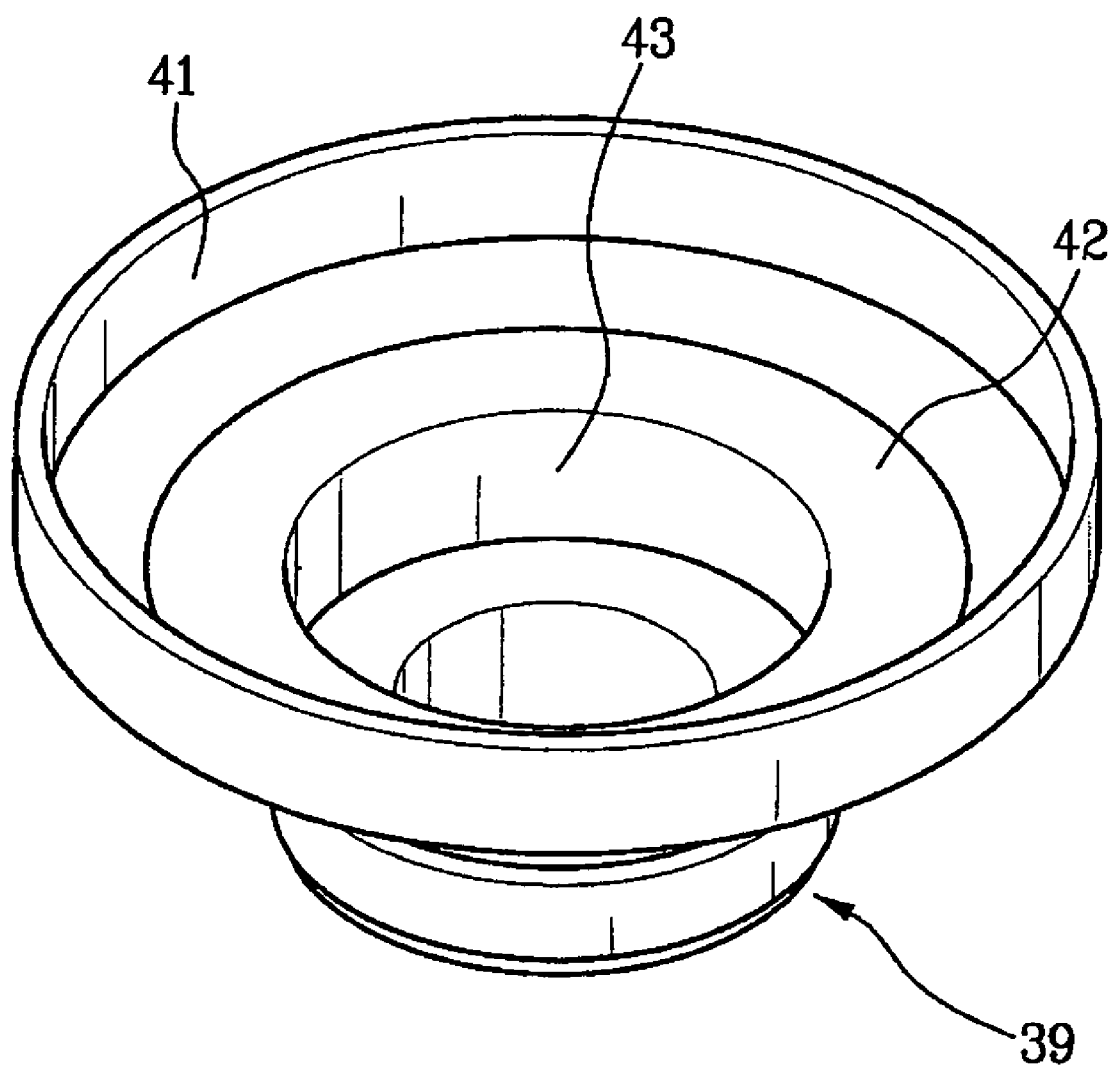
FIG. 3 is an expanded view of a pad part of FIG. 2.
Figure 4:
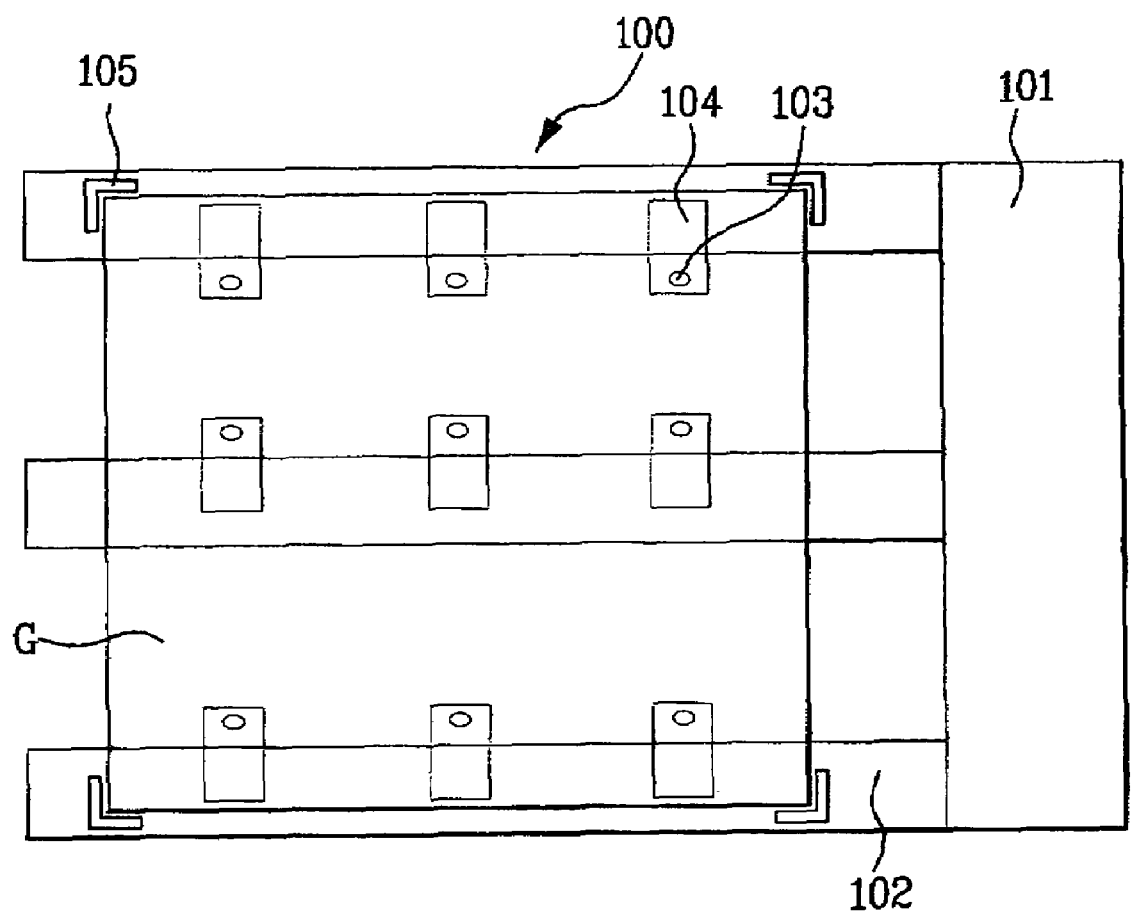
FIG. 4 is an expanded view of an exemplary hand part in a robot for transfer of glass according to the present invention.

FIG. 4 is an expanded view of an exemplary hand part of a robot for transfer of glass according to the present invention.

As illustrated in FIG. 4, the hand part 100 of the robot for transferring glass according to the present invention is provided with a connector 101, a plurality of plates 102, a plurality of pins 103, and guides 105. The hand part 100 is mounted to the fore end of a movable robot arm (not shown) so that it may be rotated and extended. A substrate G may be loaded on the hand part 100. The connector 101 connects the robot arm with the hand part 100, whereby one side of the connector 101 is connected to the robot arm. The plurality of plates 102 (also referred to as support plates) are formed at the other side of the connector 101, wherein the plurality of plates 102 are formed in one direction at fixed intervals. A plurality of pins 103 protrude from the upper surface of the respective plates 102 to fix the substrate G. The guides 105 are formed in correspondence with four corners of the substrate G to prevent the substrate from being shaken.

Although the exemplary hand part described above has a plurality of plates 102, it will be readily apparent to one of ordinary skill that the plates 102 may be a single plate. The plate may or may not have openings, and the specific shape depends on the mass of the plate and the size and mass of the substrates to be transferred. Any such variation to the shape of the plate or plates are within the scope of the invention. Further, as used herein, the use of the term glass may refer to any substrate, plate, or panel, made of glass or any other material, which is sensitive to thermally-induced defects.

Each of the pins 103 may be formed at the fixed interval from the lateral side of the plate 102, wherein the pins 103 may protrude upward, or be folded downward. The plate 102 is connected with each of the pins 103 by supporting devices 104. The pins 103 may be formed of rubber or resin having good heat resistance, or thermally insulating, characteristics, so as to minimize thermal damage to the substrate G.

The guide 105 may be higher than the pin 103, so that it is possible to prevent the substrate from being shaken when the substrate is put onto the pins 103.

In an exemplary robot for transferring glass according to the present invention, the plurality of pins 103 are formed at the predetermined interval from the plate 102 of the hand part 100 for loading the substrate. The pins 103 may be folded downward as needed. A subset of pins 103 may be selected for contacting a substrate, depending on the size, mass, temperature sensitivity, and the presence of a coating on the substrate. The other pins 103 that will not contact the substrate are folded downward prior to placing the substrate on the hand part 100. Accordingly, when moving the substrate, it is possible to decrease the contact area between the pins 103 and the substrate G.

Figure 5A:
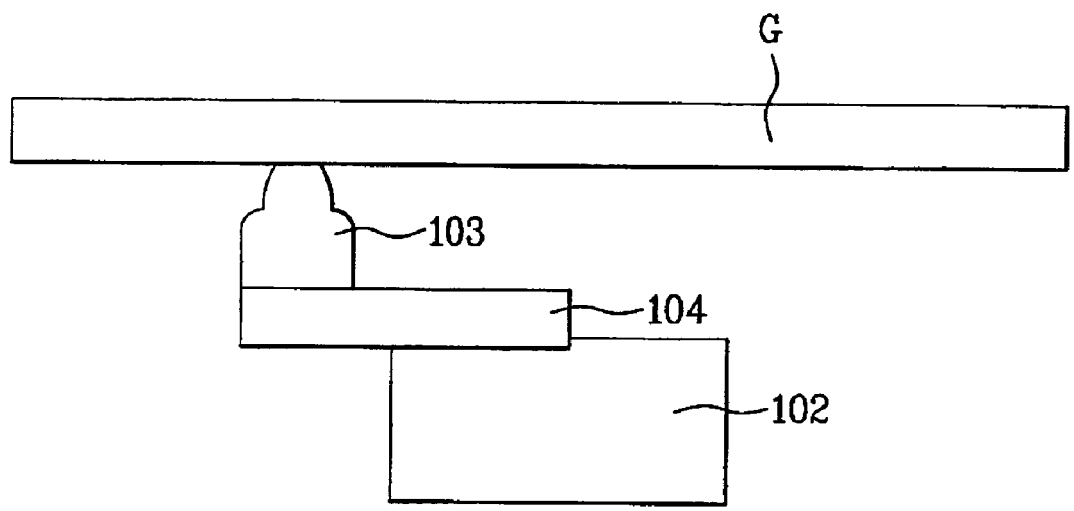
FIG. 5A and FIG. 5B are expanded views of a pin of FIG. 4.
Figure 5B:
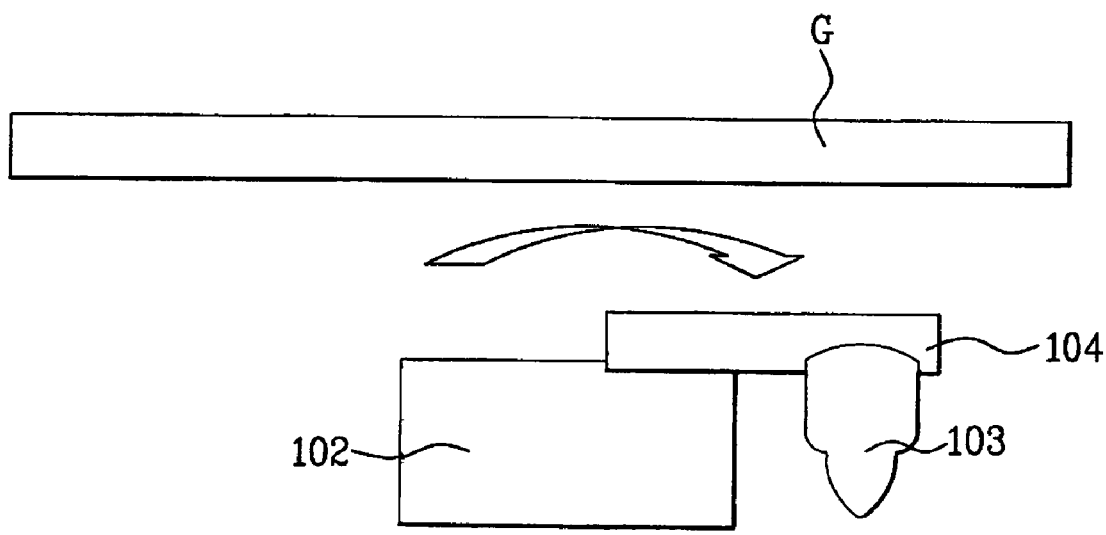

FIG. 5A and FIG. 5B are the expanded views of the pin of FIG. 4.

As illustrated in FIG. 5A and FIG. 5B, the pins 103 may protrude upward or be folded downward. The pins 103 are provided at a predetermined interval from one side of the plate 102 by supporting devices 104.

To mitigate staining of the substrate due to contact with the pins 103, the pins 103 may be folded downward. In this state, the substrate G may be loaded and moved.

As mentioned above, the robot for transferring glass according to the present invention has the following advantages.

In the hand part of the robot, the pins may be folded downward. Accordingly, it is possible to minimize the contact area between the pins and the substrate, thereby preventing stains from being generated on the substrate.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A robot for transferring a substrate, comprising:
   a robot arm; and
   a hand part mounted at a fore end of the robot arm,
   wherein the hand part includes:
      a connector having a side connected to the robot arm;
      at least two plates being connected to the second side of the connector opposite the side connected to the robot arm and having supporting devices; and
      a pin disposed on an upper surface of each supporting device, and
   wherein a subset of pins can individually protrude to contact a substrate and the other pins can individually be folded downward not to contact a substrate;
   a plurality of guides formed at the positions on the plates corresponding to four corners of a substrate.

2. The robot of claim 1, wherein the plurality of plates are arranged at fixed intervals.

3. The robot of claim 1, wherein the guides are higher than a tip of each of the plurality of pins.

4. The robot of claim 1, wherein one pin is spaced from other pins.

5. The robot of claim 1, wherein each pin in the plurality of pins includes rubber having thermally insulating characteristics.

6. The robot of claim 1, wherein each pin in the plurality of pins includes a resin having thermally insulating characteristics.

* * * * *